US 008254050 B2

(12) United States Patent
Vaidyanathan et al.

(10) Patent No.: US 8,254,050 B2
(45) Date of Patent: Aug. 28, 2012

(54) SYSTEM AND METHOD FOR DETERMINING VIBRATION OF AT LEAST ONE HARD DISK DRIVE

(75) Inventors: Kalyanaraman Vaidyanathan, San Diego, CA (US); Kenny C. Gross, San Diego, CA (US); Aleksey M. Urmanov, La Jolla, CA (US)

(73) Assignee: Oracle America, Inc., Redwood City, CA (US)

( * ) Notice: Subject to any disclaimer, the term of this patent is extended or adjusted under 35 U.S.C. 154(b) by 264 days.

(21) Appl. No.: 12/491,646

(22) Filed: Jun. 25, 2009

(65) Prior Publication Data

US 2010/0328798 A1    Dec. 30, 2010

(51) Int. Cl.
*G11B 5/02* (2006.01)

(52) U.S. Cl. .......................................................... 360/55

(58) Field of Classification Search .................. 360/55, 360/31, 75, 69, 77.02, 99.08; 711/173; 369/47.53, 369/47.44, 44.28, 47.3, 53.31, 53.18
See application file for complete search history.

(56) References Cited

U.S. PATENT DOCUMENTS

| | | | | |
|---|---|---|---|---|
| 6,351,440 B1 * | 2/2002 | Fukuda et al. | ............. | 369/47.36 |
| 6,421,197 B1 * | 7/2002 | Abdelnour | ................. | 360/77.02 |
| 6,445,658 B1 * | 9/2002 | Fukuda et al. | ............. | 369/47.44 |
| 6,534,890 B2 * | 3/2003 | Rafaelof | ....................... | 310/91 |
| 6,631,105 B1 * | 10/2003 | Fukuda et al. | ............. | 369/47.44 |
| 6,785,208 B1 * | 8/2004 | Fujimoto et al. | ........... | 369/53.18 |
| 6,898,051 B2 * | 5/2005 | Bahirat et al. | ............. | 360/99.08 |
| 7,196,980 B2 * | 3/2007 | Takahashi | .................. | 369/44.28 |
| 7,349,307 B2 * | 3/2008 | Kim et al. | .................. | 369/47.53 |
| 7,401,000 B2 * | 7/2008 | Nakamura | .................... | 702/145 |
| 7,565,226 B1 | 7/2009 | Cooley et al. | | |
| 7,680,008 B2 * | 3/2010 | Chou et al. | ................. | 369/53.31 |
| 7,801,700 B2 * | 9/2010 | Gross et al. | .................... | 702/182 |
| 7,808,864 B2 * | 10/2010 | Sasaki | ......................... | 369/47.28 |
| 7,890,278 B2 * | 2/2011 | Vacar et al. | ..................... | 702/56 |
| 2002/0024902 A1 * | 2/2002 | Sasaki | ........................ | 369/47.39 |
| 2004/0027799 A1 | 2/2004 | King et al. | | |
| 2005/0254373 A1 * | 11/2005 | Wu et al. | ..................... | 369/47.21 |
| 2009/0082068 A1 * | 3/2009 | Sakai | ............................ | 455/567 |
| 2010/0005237 A1 * | 1/2010 | Bougaev et al. | .............. | 711/111 |
| 2010/0024555 A1 * | 2/2010 | Gross et al. | ..................... | 73/579 |
| 2010/0153680 A1 * | 6/2010 | Baum et al. | .................... | 711/173 |
| 2010/0326193 A1 * | 12/2010 | Gross et al. | ..................... | 73/579 |
| 2010/0329088 A1 * | 12/2010 | Kayanuma | ................. | 369/44.13 |

OTHER PUBLICATIONS

Non-Final Office Action dated Nov. 7, 2008 for U.S. Appl. No. 11/701,649, filed Feb. 2, 2007, 7 pgs.
Response to Non-Final Office Action dated Nov. 7, 2008 for U.S. Appl. No. 11/701,649, filed Feb. 21, 2009, 7 pgs.

* cited by examiner

*Primary Examiner* — Fred Tzeng
(74) *Attorney, Agent, or Firm* — Brooks Kushman P.C.

(57) ABSTRACT

A system for determining vibration of at least one hard disk drive includes one or more computers configured to command a plurality of reads from the at least one hard disk drive such that, for each of the plurality of reads, data stored on the at least one hard disk drive is retrieved directly from the at least one hard disk drive. The one or more computers are also configured to obtain read rate information related to the plurality of reads and to determine a vibration level experienced by the at least one hard disk drive based on the read rate information.

15 Claims, 4 Drawing Sheets

SYSTEM AND METHOD FOR DETERMINING VIBRATION OF AT LEAST ONE HARD DISK DRIVE

BACKGROUND

Referring to FIG. 1, hard disk drive (HDD) write throughput is plotted as a function of vibration level. The data for this plot was generated by measuring HDD write speed (in KB/sec) for various GRMS inputs after securing the HDD to a shake table. As known in the art, shake tables provide random vibrations. HDD throughput appears to decrease as horizontal random vibration increases.

Referring now to FIG. 2, HDD vibration was correlated with shake table vibration (vertical and horizontal). HDD vibration appears to exhibit a high degree of correlation with shake table vibration.

The decrease in HDD throughput as a function of shake table vibration illustrated in FIG. 1 appears to result from vibration of the HDD. Current read/write magnetic heads are expected to read/write tracks of a HDD having widths less than about 20 nanometers while floating about 7 nanometers above the disk surface. The random vibration of the HDD may cause the magnetic head to skip tracks. Vibration, therefore, may affect the performance of read/write heads.

SUMMARY

A system for determining vibration of at least one hard disk drive includes one or more computers configured to command a plurality of reads from the at least one hard disk drive such that, for each of the plurality of reads, data stored on the at least one hard disk drive is retrieved directly from the at least one hard disk drive. The one or more computers are also configured to obtain read rate information related to the plurality of reads and to determine a vibration level experienced by the at least one hard disk drive based on the read rate information.

A method for determining vibration of at least one hard disk drive includes commanding a plurality of writes to the at least one hard disk drive such that, for each of the plurality of writes, data is directly written to the at least one hard disk drive. The method also includes obtaining write rate information related to the plurality of writes and determining a vibration level experienced by the at least one hard disk drive based on the write rate information.

A computer-readable storage medium has information stored thereon for directing one or more computers to command a plurality of reads from at least one hard disk drive such that, for each of the plurality of reads, data stored on the at least one hard disk drive is retrieved directly from the at least one hard disk drive. The storage medium has further information stored thereon for directing the one or more computers to obtain read rate information related to the plurality of reads, and to determine a vibration level experienced by the at least one hard disk drive based on the read rate information.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 7 is an example plot of percentage of HDD maximum throughput versus vibration level while performing sequential reads with a read cache on.

FIG. 8 is another example plot of percentage of HDD maximum throughput versus vibration level while performing sequential reads with a read cache on.

DETAILED DESCRIPTION

Vibration characterization is increasingly being performed with disk drives to assess and better understand their degradation mechanisms and to achieve improved vibrational health. It is common to externally instrument systems/drives with accelerometers and process the data to determine the amount of vibration the drives are experiencing. In certain circumstances, however, such instrumentation may be costly or impractical.

Vibration characterization may also be performed using HDD input and/or output (I/O) as a proxy for vibration levels. While these techniques may not require the use of accelerometers, caches throughout the system may mask the impact of vibration on the system during characterization.

As known in the art, a cache may be a temporary storage area where frequently accessed data can be stored for rapid access. Once the data is stored in the cache, it can be subsequently used by accessing the cached copy rather than re-fetching or re-computing the original data. Currently, there may be caches in the OS domain, caches in the network, caches inside the disk drives, etc. Caches are usually based on solid state flash technology, which has little to no sensitivity to vibration. Consequently, it is possible to get different inferred vibration metrics depending on, for example, whether a particular OS enables or disables a domain cache by default. Similarly, a vibration assessment script run on a system via remote login may yield completely different results compared with the same script run via a local console simply because of the presence/absence of a network cache.

Figure 3:
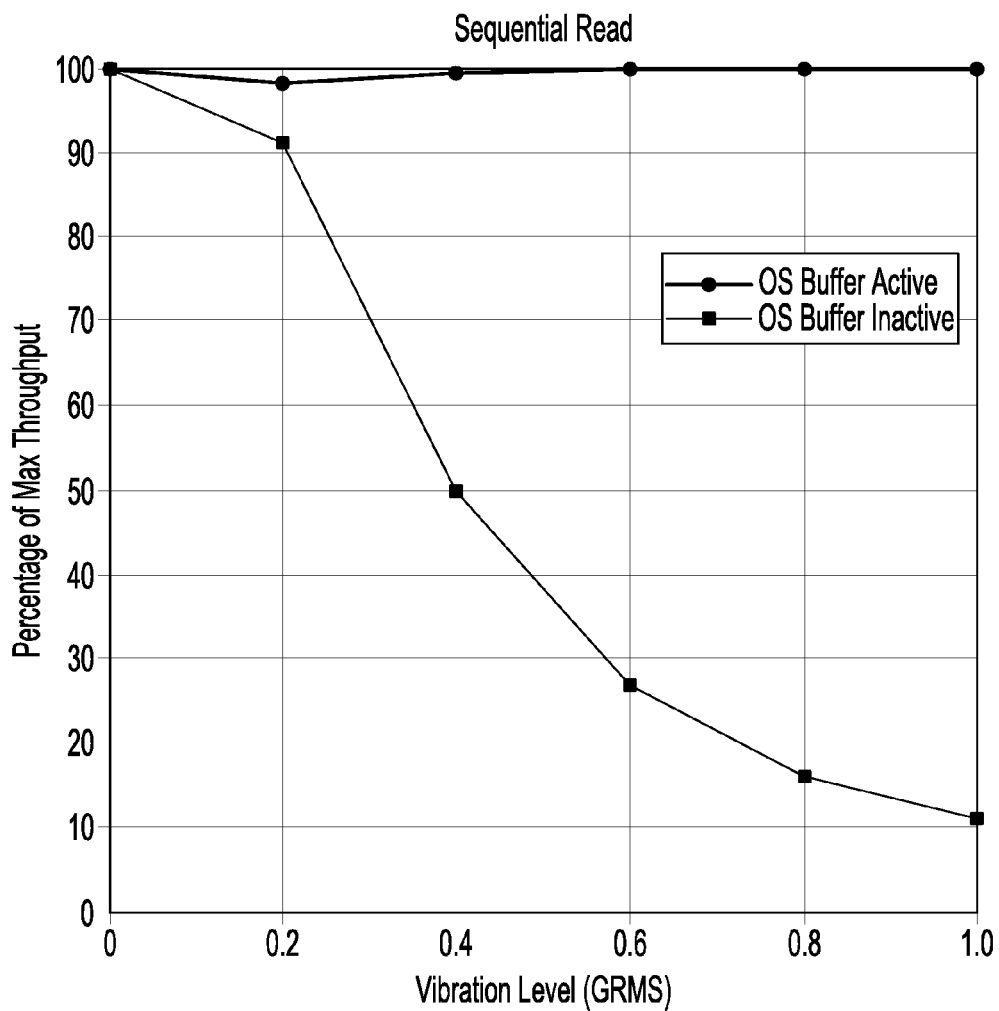
FIG. 3 is an example plot of percentage of HDD maximum throughput versus vibration level.

Referring now to FIG. 3, the percentage of maximum throughput for an HDD subjected to differing levels of vibration (via a shake table) remained relatively unchanged for read/write activity with an active OS buffer. The percentage of maximum throughput for the same HDD subjected to differing levels of vibration (via the shake table), however, decreased for read/write activity with an inactive OS buffer. Buffers (caches, etc.) may prevent one from observing the effects of vibration on I/O rates and thus confound attempts to infer disk vibration levels based on I/O rates.

Certain vibration characterization techniques described herein do not rely on accelerometers, and yet are relatively immune to the effects caches may have on I/O rates. In certain embodiments, a vibration-calibrated disk read/write activity generator that bypasses caches in the OS, network or HDD may be used in conjunction with system telemetry to infer vibration levels. Time and effort need not be spent on instrumenting the system with accelerometers. Additionally, more consistent and reproducible results may be obtained regardless of the presence/absence of flash-based caches in the system.

In one example, random reads are performed at the outer tracks of a disk drive with varying block sizes (e.g., block sizes increasing from 4 KB to 256 KB or greater). This may ensure that pre-fetching data from any read caches is not beneficial to performance by causing cache misses to occur. Hence, data is retrieved from the drive rather than the cache. Resulting read rates may be used to infer vibration level via, for example, a plot similar to that illustrated in FIG. 1.

In another example, random (as opposed to sequential) writes are performed at the outer tracks of a disk drive using random data patterns. (Data from a file or a constant write pattern is not written.) Writes may be more sensitive to vibration than reads. This may ensure that caches are not involved in this process. Resulting write rates may be used to infer vibration level via, for example, a plot similar to that illustrated in FIG. 1.

In yet another example, both reads and writes are performed on the disk raw device rather than the block (or logical) device to ensure that any OS buffers are not involved in this process. Resulting read and/or write rates may be used to infer vibration level as mentioned above.

The effect of vibration on I/O may be system/platform/drive type specific. I/O vibration signatures (similar to that illustrated in FIG. 1) may be generated via testing for each system/platform/drive type. For example, a particular system/platform/drive type may be instrumented with known telemetry tools, anchored to a shake table, and performance monitored and recorded for various vibration inputs. This data may later be used outside the test environment to infer vibration level based on observed I/O rates for that particular drive.

To ensure that active caches do not mask the effects of vibration when characterizing systems based on read rates, the latency associated with reads of increasing block size may first be observed to determine a block size that necessarily bypasses any caches in the system as discussed below with reference to FIG. 5. Such may not be necessary when characterizing drives by themselves (i.e., characterizing drives that have been removed from their systems) as no caches are present.

Figure 4:
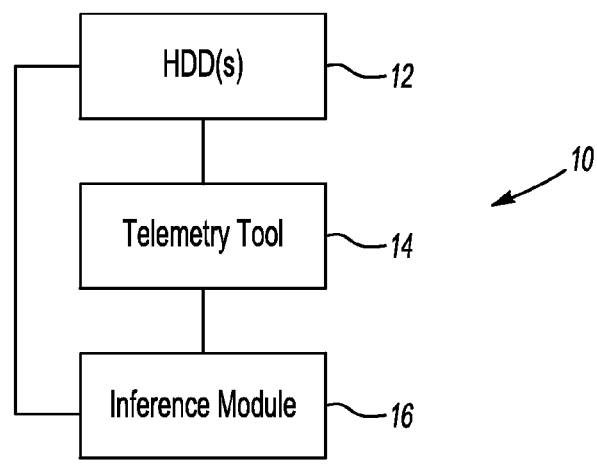
FIG. 4 is a block diagram of an embodiment of a vibration characterization system.

Referring now to FIG. 4, an embodiment of a vibration characterization system 10 for one or more HDDs 12 may include a known telemetry tool 14 (e.g., sensors, control circuitry, etc.) and an inference module 16 (e.g., computer(s), controller, control module, hardware, firmware executing on a processor, software executing on a processor, etc.). The telemetry tool 14 may be arranged and configured, in a known fashion, to observe various performance parameters, such as I/O rate, latency, etc., associated with the one or more HDDs 12 and report this information to the inference module 16. The inference module 16, as explained below, may store and use the telemetry information to infer the vibration level of the one or more HDDs 12.

Figure 5:
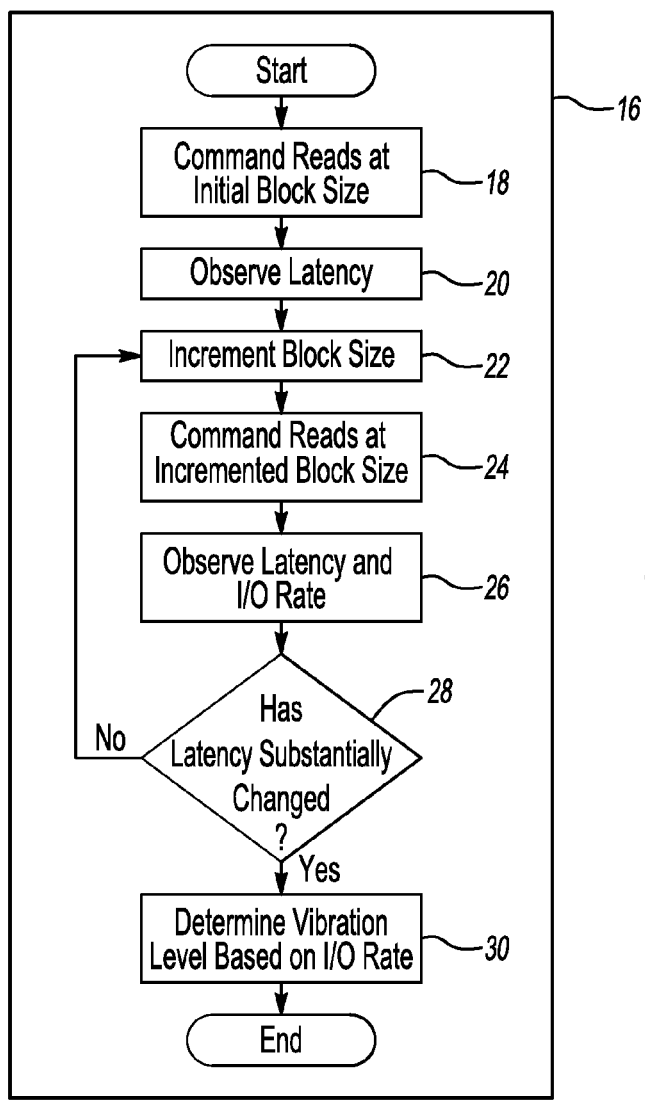
FIG. 5 is a flow chart illustrating an example algorithm for determining vibration levels experienced by the HDDs of FIG. 4.

Referring now to FIGS. 4 and 5, the inference module 16 commands reads via, for example, a load generation script of the one or more HDDs 12 at an initial block size, e.g., 12 KB, at operation 18. This initial block size may be specified by a user or preset within the inference module 16. In some embodiments, the reads may be commanded from a specified set of tracks on the one or more HDDs 12. This may reduce noise in the data associated with movement of the read head.

At operation 20, the inference module 16 observes the latency associated with the reads based on information received from the telemetry tool 14.

At operation 22, the inference module 16 increments the block size by, for example, 4 KB.

At operation 24, the inference module 16 commands reads of the one or more HDDs 12 at the incremented block size, e.g., 16 KB.

At operation 26, the inference module observes the latency and I/O rates associated with the reads based on information received from the telemetry tool 14.

At operation 28, the inference module determines whether the latency associated with the reads commanded at operation 24 has substantially changed, e.g., doubled, etc., relative to the reads commanded previously. If yes, the inference module 16 determines the vibration level experienced by the one or more HDDs 12 based on the I/O rates using, for example, data similar to that illustrated in FIG. 1 at operation 30. As an example, if the observed disk reads per second is 600 KB, the vibration level may be estimated as 0.9 GRMS (using the data from FIG. 1 and assuming the y-axis is data for disk reads per second rather than disk writes per second). If no, the inference module 16 returns to operation 22 and increments the block size by, for example, another 4 KB, etc. In certain embodiments, a maximum block size may be specified such that if a substantial change in latency is not observed by the time the maximum block size is achieved, the process ends. This maximum block size may be reached, for example, in circumstances where there are no active caches and minimal vibration.

The iterative process of incrementing read block size and observing corresponding latencies may be used to determine when caches within a system are being bypassed. If, for example, the latencies associated with read commands of block sizes between 4 KB and 128 KB remain relatively unchanged, one can assume that caches are in use. If the latencies associated with read commands of block sizes greater than 128 KB substantially change (relative to those of block sizes between 4 KB and 128 KB), one can assume that caches are no longer in use, and that data is being read directly from disk. Of course, if a particular block size is known (through testing or experience) to be of sufficient size such that caches are bypassed during reads, that block size, in certain embodiments, may be specified at the beginning of the process. Other scenarios are also possible.

Figure 6:
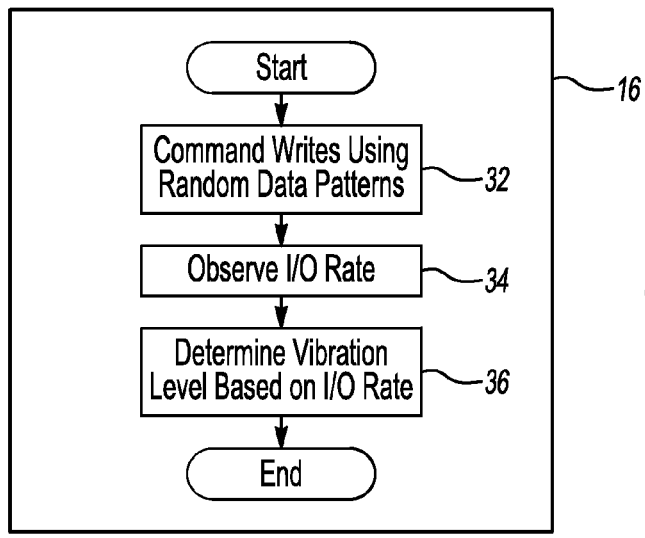
FIG. 6 is a flow chart illustrating another example algorithm for determining vibration levels experienced by the HDDs of FIG. 4.

Referring now to FIGS. 4 and 6, the inference module 16 commands random data writes to the one or more HDDs 12 at operation 32. In some embodiments, the writes may be commanded to a specified set of tracks on the one or more HDDs 12. As explained above, this may reduce noise in the data associated with movement of the write head. The data for the writes are generated, for example, via a random number generator or pseudo random number generator. As apparent to those of ordinary skill, the pseudo random number generator may be used in circumstances where repeatability in testing is desired. The same seed may be used to generate the same sequence of pseudo random numbers between tests.

At operation 34, the inference module 16 observes the I/O rates associated with the writes based on information received from the telemetry tool 14.

Figure 1:
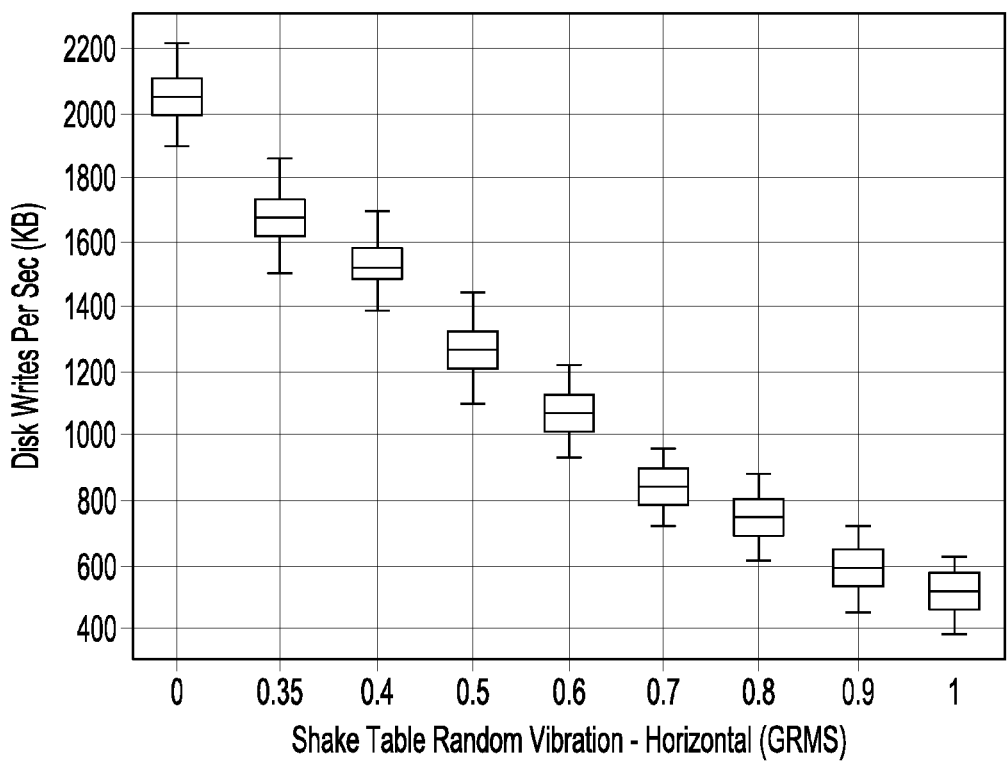
FIG. 1 is an example plot of HDD throughput versus shake table vibration.
Figure 2:
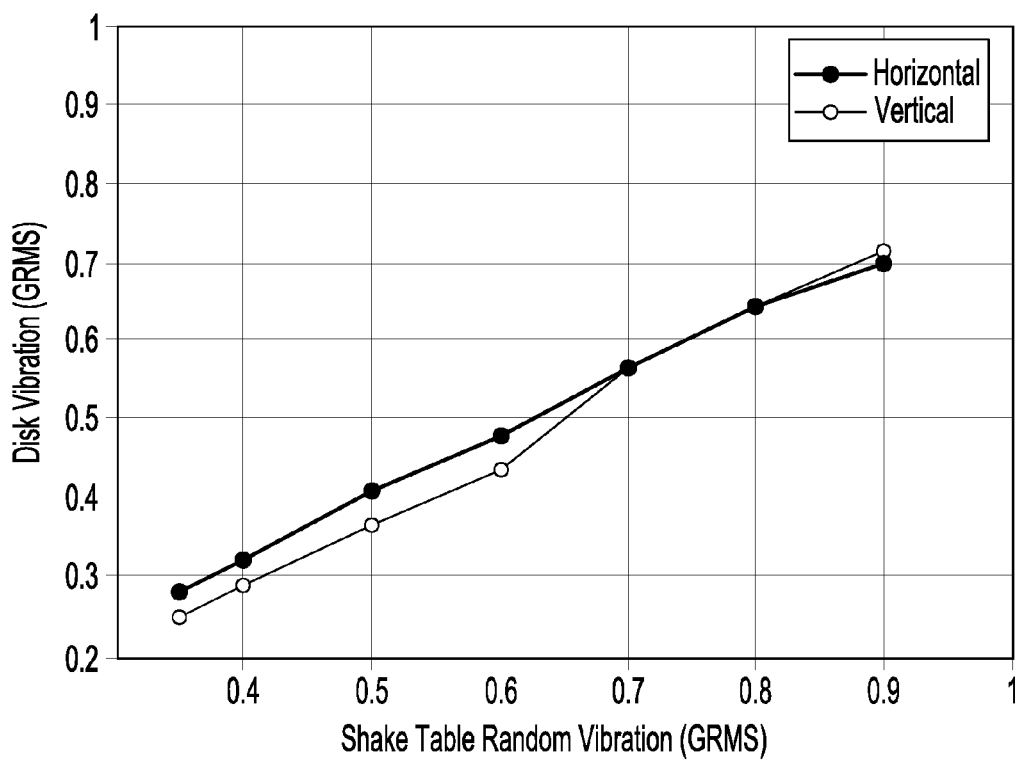
FIG. 2 is an example plot of HDD vibration versus shake table vibration.

At operation 36, the inference module 16 determines the vibration level experienced by the one or more HDDs 12 based on the I/O rates using, for example, data similar to that illustrated in FIG. 1.

Figure 7:
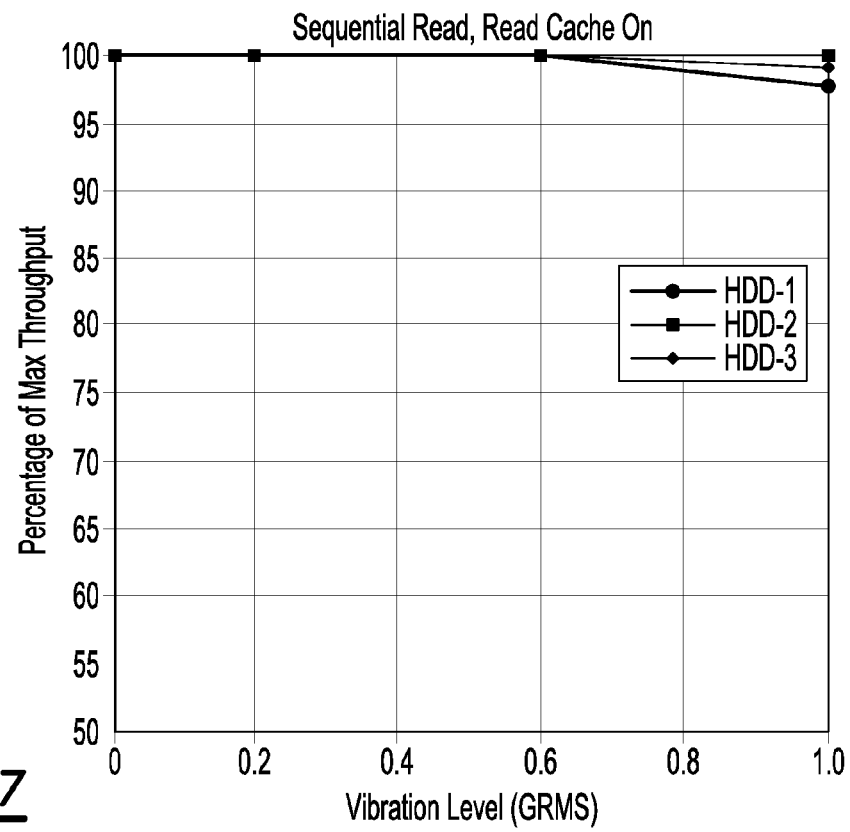
Figure 8:
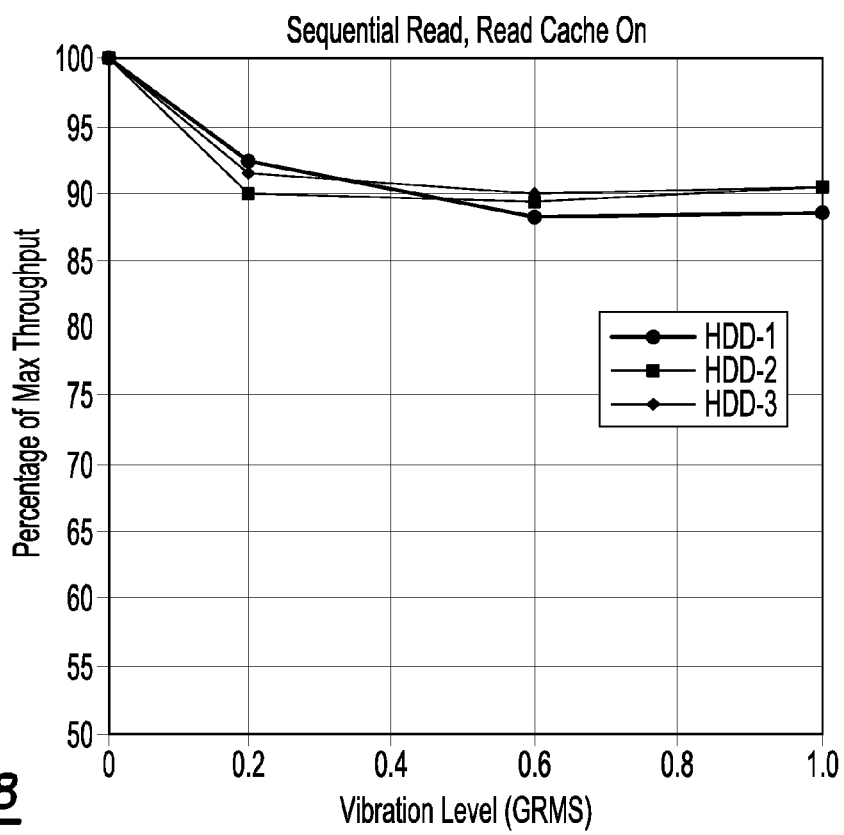

Referring now to FIGS. 7 and 8, percentage of maximum HDD throughput was observed for several HDDs with a read cache on while performing sequential reads. The HDDs were subjected to vibration input via a shake table. The read commands associated with the data of FIG. 7 were generated without regard as to whether the read cache would necessarily be bypassed. The percentage of maximum throughput remained relatively unchanged for vibration levels ranging between 0 and 1.0 GRMS. In contrast, the read commands associated with the data of FIG. 8 were generated taking into consideration whether the read cache would necessarily be bypassed. That is, the read commands were generated such that the read cache would necessarily be bypassed using techniques similar to those described herein. The percentage of maximum throughput dropped from 100% to approximately 90% between 0 and 0.2 GRMS and remained at approximately 90% from 0.2 to 1.0 GRMS. The latter throughput data gives a more accurate picture of the vibration experienced by the HDDs because the associated set of read commands necessarily bypassed the read cache.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A system for determining vibration of at least one hard disk drive, the system comprising:
one or more computers configured to (i) command a plurality of sequential reads of increasing block size from the at least one hard disk drive, (ii) obtain read rate information and latency information related to the plurality of reads, (iii) determine whether a particular block size is of a sufficient size such that data stored on the at least one hard disk drive is directly retrieved from the at least one hard disk drive based on the latency information, and (iv) determine a vibration level experienced by the at least one hard disk drive based on the read rate information.

2. The system of claim 1 wherein the plurality of reads are commanded from a specified set of tracks on the at least one hard disk drive.

3. The system of claim 2 wherein the specified set of tracks are outermost tracks of the at least one hard disk drive.

4. The system of claim 1 wherein the one or more computers are further configured to store the read rate information related to the plurality of reads.

5. The system of claim 1 wherein determining a vibration level experienced by the at least one hard disk drive based on the read rate information includes comparing the read rate information with reference read rate information.

6. The system of claim 5 wherein the reference read rate information is a function of vibration level in the absence of cache operation.

7. A non-transitory computer-readable storage medium having information stored thereon for directing one or more computers to (i) command a plurality of reads from outermost tracks of at least one hard disk drive such that, for each of the plurality of reads, data stored on the at least one hard disk drive is retrieved directly from the at least one hard disk drive, (ii) obtain read rate information related to the plurality of reads, and (iii) determine a vibration level experienced by the at least one hard disk drive based on the read rate information.

8. The storage medium of claim 7 wherein the information stored thereon is further configured to direct the one or more computers to command a plurality of sequential reads of increasing block size from the at least one hard disk drive and to obtain latency information related to the plurality of sequential reads of increasing block size.

9. The storage medium of claim 8 wherein the information stored thereon is further configured to direct the one or more computers to determine whether a particular block size is of a sufficient size such that data stored on the at least one hard disk drive is directly retrieved from the at least one hard disk drive based on the latency information.

10. A system for determining vibration of at least one hard disk drive, the system comprising:
one or more computers configured to (i) command a plurality of reads from outermost tracks of the at least one hard disk drive such that, for each of the plurality of reads, data stored on the at least one hard disk drive is retrieved directly from the at least one hard disk drive, (ii) obtain read rate information related to the plurality of reads, and (iii) determine a vibration level experienced by the at least one hard disk drive based on the read rate information.

11. The system of claim 10 wherein the one or more computers are further configured to command a plurality of sequential reads of increasing block size from the at least one hard disk drive and obtain latency information related to the plurality of sequential reads of increasing block size.

12. The system of claim 11 wherein the one or more computers are further configured to determine whether a particular block size is of a sufficient size such that data stored on the at least one hard disk drive is directly retrieved from the at least one hard disk drive based on the latency information.

13. The system of claim 10 wherein the one or more computers are further configured to store the read rate information related to the plurality of reads.

14. The system of claim 10 wherein determining a vibration level experienced by the at least one hard disk drive based on the read rate information includes comparing the read rate information with reference read rate information.

15. The system of claim 14 wherein the reference read rate information is a function of vibration level in the absence of cache operatio

* * * * *

UNITED STATES PATENT AND TRADEMARK OFFICE
CERTIFICATE OF CORRECTION

PATENT NO. : 8,254,050 B2
APPLICATION NO. : 12/491646
DATED : August 28, 2012
INVENTOR(S) : Vaidyanathan et al.

Page 1 of 1

It is certified that error appears in the above-identified patent and that said Letters Patent is hereby corrected as shown below:

Column 6, Line 57, Claim 15:

After "absence of cache", delete "operatio" and
Insert -- operation. --.

Signed and Sealed this
Twenty-fifth Day of December, 2012

David J. Kappos
*Director of the United States Patent and Trademark Office*